(12) United States Patent
Okamoto

(10) Patent No.: US 11,002,845 B2
(45) Date of Patent: May 11, 2021

(54) RADAR DEVICE AND TARGET HEIGHT ESTIMATION METHOD

(71) Applicant: DENSO TEN Limited, Kobe (JP)

(72) Inventor: Takayuki Okamoto, Kobe (JP)

(73) Assignee: DENSO TEN Limited, Kobe (JP)

( * ) Notice: Subject to any disclaimer, the term of this patent is extended or adjusted under 35 U.S.C. 154(b) by 241 days.

(21) Appl. No.: 15/893,051

(22) Filed: Feb. 9, 2018

(65) Prior Publication Data

US 2018/0259634 A1    Sep. 13, 2018

(30) Foreign Application Priority Data

Mar. 8, 2017 (JP) .............................. JP2017-044023

(51) Int. Cl.
| | |
|---|---|
| *G01S 13/34* | (2006.01) |
| *G01S 13/931* | (2020.01) |
| *G01S 7/35* | (2006.01) |
| *G01S 7/41* | (2006.01) |
| *G01S 13/46* | (2006.01) |
| *G01S 13/42* | (2006.01) |
| *G01S 13/72* | (2006.01) |
| *G01S 7/40* | (2006.01) |

(52) U.S. Cl.
CPC ............ *G01S 13/345* (2013.01); *G01S 7/354* (2013.01); *G01S 7/414* (2013.01); *G01S 13/42* (2013.01); *G01S 13/46* (2013.01); *G01S 13/726* (2013.01); *G01S 13/931* (2013.01); *G01S 2007/4034* (2013.01); *G01S 2013/462* (2013.01)

(58) Field of Classification Search
CPC ...... G01S 13/345; G01S 13/726; G01S 13/42; G01S 13/46; G01S 7/414; G01S 7/354; G01S 13/931; G01S 2007/4034; G01S 2013/462
USPC ......................................................... 342/128
See application file for complete search history.

(56) References Cited

U.S. PATENT DOCUMENTS 4,796,031 A * 1/1989 Koki ...................... G01S 13/42
342/148
5,140,329 A * 8/1992 Maughan ................ F41G 3/142
342/67

(Continued)

FOREIGN PATENT DOCUMENTS

| JP | H09-288178 A | 11/1997 |
| JP | 2014-052187 A | 3/2014 |
| JP | 2016-206158 A | 12/2016 |

*Primary Examiner* — Frank J McGue
(74) *Attorney, Agent, or Firm* — Oliff PLC

(57) ABSTRACT

There is provided a radar device configured to detect a target by executing signal processing on the basis of a transmission wave and a reflection wave of the transmission wave reflected on the target. An antenna unit having a plurality of antennas arranged in a vertical direction. A calculation unit configured to calculate vertical azimuths of the target on the basis of the reflection waves with respect to the transmission waves transmitted from each of the antennas, and to accumulate calculation results. An estimation unit configured to calculate moving average values of maximum values of the vertical azimuths on the basis of the calculation results accumulated by the calculation unit, and to estimate the moving average values of the maximum values, as a height of the target.

5 Claims, 15 Drawing Sheets

(56) References Cited

U.S. PATENT DOCUMENTS

| | | | | |
|---|---|---|---|---|
| 5,638,462 | A * | 6/1997 | Shirakawa | G06K 9/00476 |
| | | | | 382/186 |
| 5,959,571 | A * | 9/1999 | Aoyagi | G01S 13/325 |
| | | | | 342/145 |
| 6,333,713 | B1 * | 12/2001 | Nakagawa | G01S 3/74 |
| | | | | 342/417 |
| 9,739,881 | B1 * | 8/2017 | Pavek | G01S 13/89 |
| 9,869,762 | B1 * | 1/2018 | Alland | H01Q 21/28 |
| 2004/0027305 | A1 * | 2/2004 | Pleva | G01S 13/343 |
| | | | | 343/853 |
| 2006/0082501 | A1 * | 4/2006 | Chiang | G01S 3/48 |
| | | | | 342/442 |
| 2010/0321231 | A1 * | 12/2010 | Nakahama | G01S 7/062 |
| | | | | 342/118 |
| 2012/0200469 | A1 * | 8/2012 | Cooper | H01Q 1/38 |
| | | | | 343/770 |
| 2016/0209504 | A1 * | 7/2016 | Steinhauer | G01S 3/44 |

\* cited by examiner

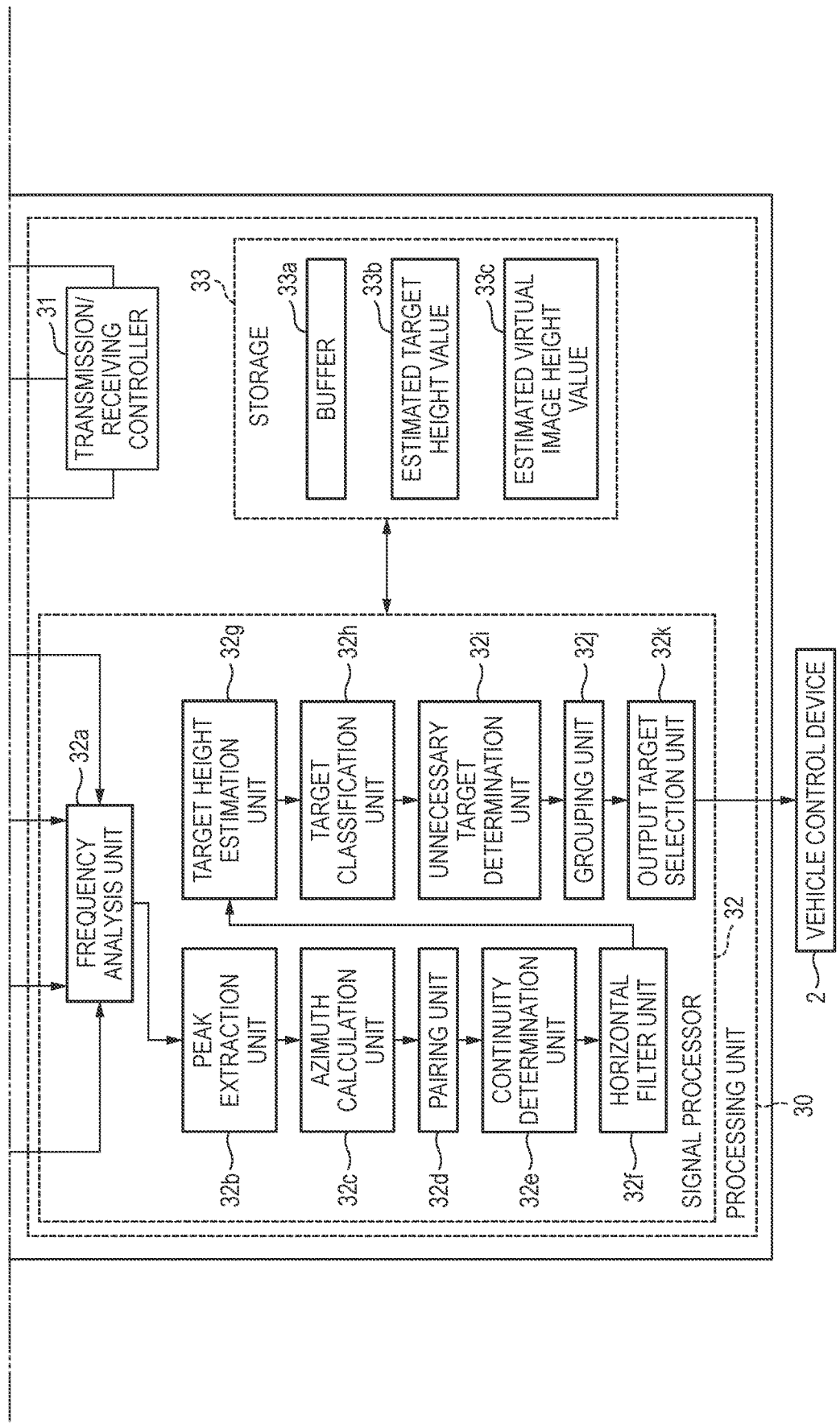
(FIG. 2A CONTINUED)

RADAR DEVICE AND TARGET HEIGHT ESTIMATION METHOD

CROSS-REFERENCE TO RELATED APPLICATION

This application is based on and claims priority under 35 USC 119 from Japanese Patent Application No. 2017-44023 filed on Mar. 8, 2017.

BACKGROUND

Technical Field

The present disclosure relates to a radar device and a target height estimation method.

Related Art

In the related art, a radar device has been known which is mounted in a vehicle or the like and is configured to receive a reflection wave, which is formed as a transmission wave transmitted from the vehicle collides with a target and is reflected from the target, and to detect the target on the basis of the obtained received signal.

As the radar device, there is a radar device that includes a plurality of antennas configured to two-dimensionally scan a distance and a horizontal azimuth of a target and arranged in a vertical direction, and is configured to estimate a vertical angle, at which the target is estimated to exist, i.e., a height of the target, based on a received signal with respect to transmission waves from each antenna (for example, refer to Patent Document 1). Thereby, it is possible to detect a superjacent object such as a road sign and a signboard.
Patent Document 1: JP-A-H09-288178

However, the above technology has room for further improvement in estimating the height of the target with accuracy.

Specifically, according to the radar device, when it is intended to detect the superjacent object, the direct reflection waves from the superjacent object and the reflection waves from the superjacent object via a road surface or the like interfere with each other, so that a so-called multipath occurs and a signal level and the like with respect to the superjacent object are likely to be unstable. For this reason, the estimation accuracy of the height of the target, which is the superjacent object, may be lowered.

SUMMARY

It is therefore an object of the disclosure to provide a radar device and a target height estimation method capable of estimating a height of a target with accuracy.

According to an aspect of the embodiments of the present invention, there is provided a radar device configured to detect a target by executing signal processing on the basis of a transmission wave and a reflection wave of the transmission wave reflected on the target, the radar device including: an antenna unit having a plurality of antennas arranged in a vertical direction; a calculation unit configured to calculate vertical azimuths of the target on the basis of the reflection waves with respect to the transmission waves transmitted from each of the antennas, and to accumulate calculation results, and an estimation unit configured to calculate moving average values of maximum values of the vertical azimuths on the basis of the calculation results accumulated by the calculation unit, and to estimate the moving average values of the maximum values, as a height of the target.

According to the above configuration, it is possible to estimate the height of the target with accuracy.

BRIEF DESCRIPTION OF THE DRAWINGS

Exemplary embodiments of the present invention will be described in detail based on the following figures, wherein.

DETAILED DESCRIPTION

Hereinafter, an illustrative embodiment of the radar device and the target height estimation method of the present disclosure will be described in detail with reference to the accompanying drawings. In the meantime, the present disclosure is not limited to the illustrative embodiment to be described later.

Also, in the below, after describing an outline of a target height estimation method in accordance with the illustrative embodiment with reference to FIGS. 1A and 1B, a radar device 1 to which the target height estimation method of the illustrative embodiment is applied will be described with reference to FIGS. 2A to 7B.

Meanwhile, in the below, an example where the radar device 1 adopts an FM-CW (Frequency Modulated Continuous Wave) method and is mounted to an own vehicle MC is described.

First, an outline of the target height estimation method in accordance with the illustrative embodiment is described with reference to FIGS. 1A to 1D. FIG. 1A depicts a situation where a target TG is a superjacent object. FIG. 1B depicts calculation results of a height of the target TG, based on reflection waves from the superjacent object. FIGS. 1C and 1D illustrate an outline of the target height estimation method in accordance with the illustrative embodiment.

First, the radar device 1 of the illustrative embodiment includes a vertical direction antenna (hereinafter, referred to as "vertical antenna") having a plurality of antennas arranged in a vertical direction. The radar device 1 can receive reflection waves, which are formed as transmission waves transmitted from the vertical antenna collide with the target TG and are reflected from the target, and perform calculation for estimating an arrival direction of the reflection waves on the basis of the obtained received signals, thereby obtaining an angle of the vertical direction (hereinafter, referred to as "vertical azimuth") at which the target TG is estimated to exist.

Figure 1A:
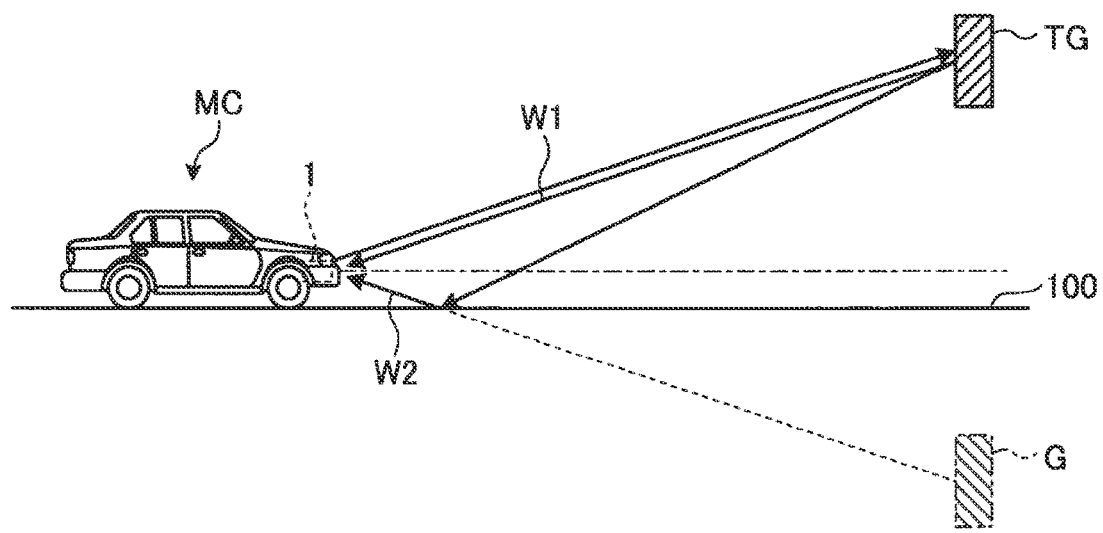
FIG. 1A depicts a situation where a target is a superjacent object.

In the meantime, as shown in FIG. 1A, in case the target TG is a superjacent object, a so-called multipath occurs, so that a synthetic wave of a reflection wave W1 (hereinafter, referred to as "direct wave W1") directly arriving from the target TG and a reflection wave W2 (hereinafter, referred to as "via wave W2") arriving from the target TG via a road surface 100 is incident on the radar device 1.

Therefore, the radar device 1 is required to calculate the vertical azimuth of the target TG from the synthetic wave. However, a vertical azimuth of a virtual image G of the target TG corresponding to the via wave W2 is obtained or an SN (Signal-Noise) ratio based on a distance between the own vehicle MC and the target TG is deteriorated, so that the calculation results become unstable, as shown in FIG. 1B.

Figure 1B:
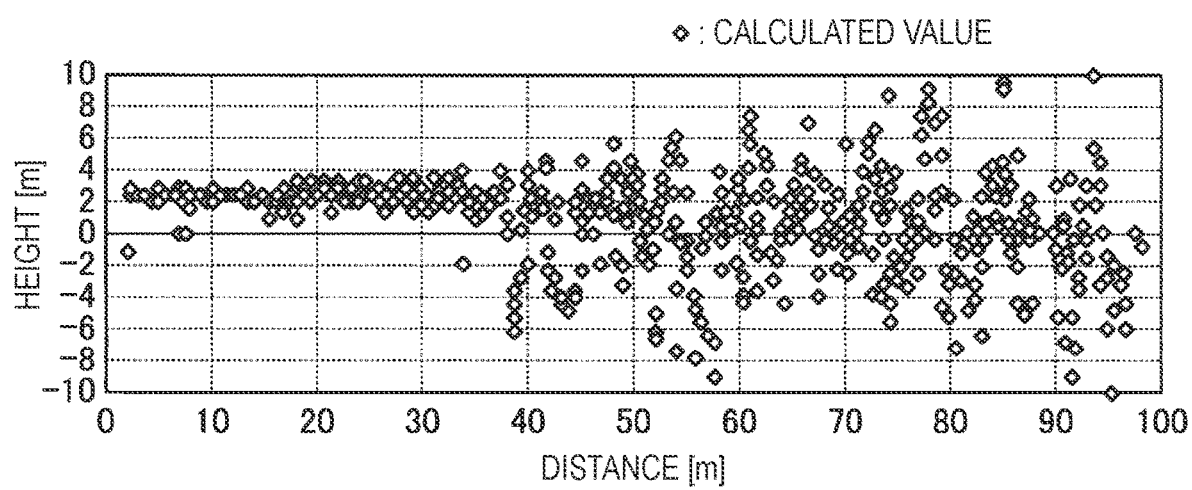
FIG. 1B depicts calculation results of a height of the target, based on reflection waves from the superjacent object.
Figure 1C:
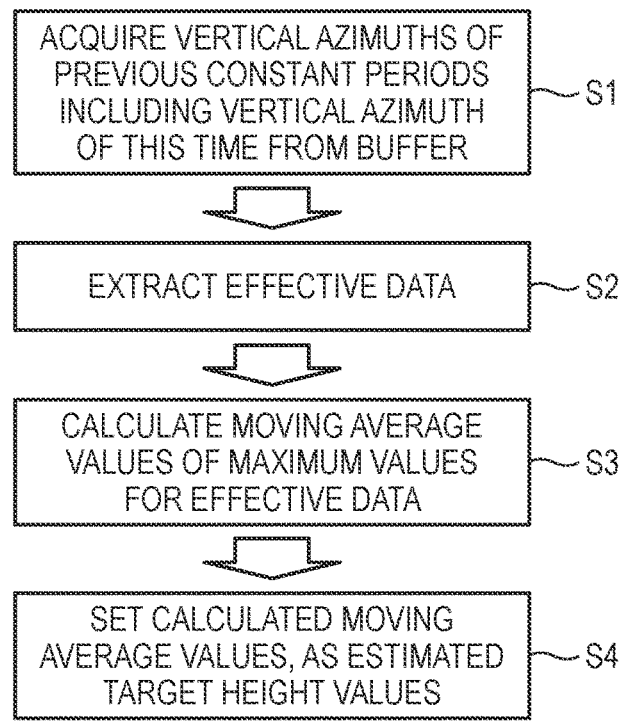
FIG. 1C illustrates an outline of a target height estimation method in accordance with an illustrative embodiment.
Figure 1D:
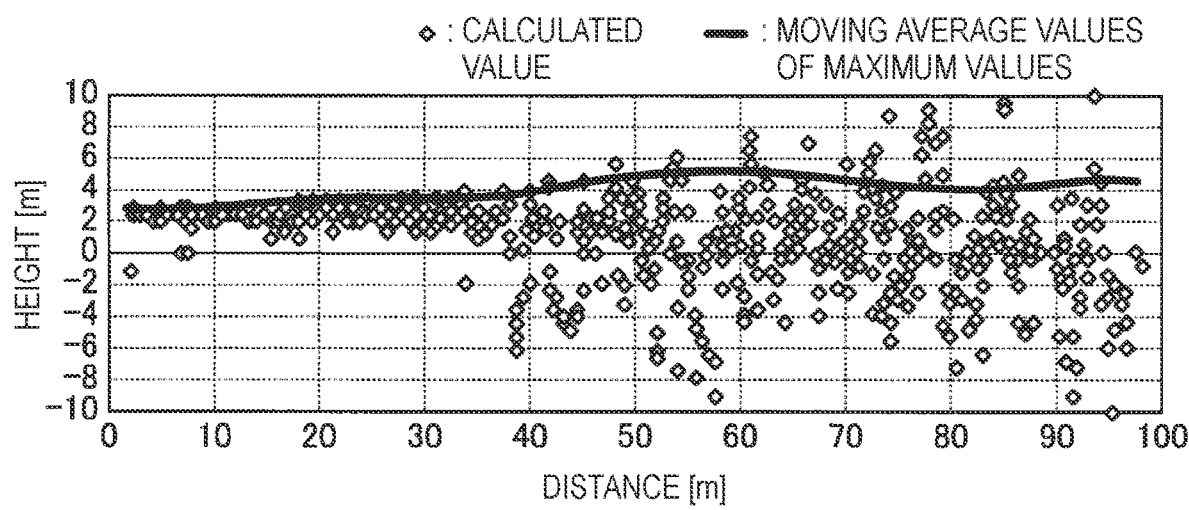
FIG. 1D illustrates the outline of the target height estimation method in accordance with the illustrative embodiment.

As can be seen from FIG. 1B, within a range in which the distance between the own vehicle MC and the target TG is up to 30 m, the calculation results in which the height of the target TG is substantially stable about 3 m are obtained. However, when the distance is far away from 30 m, the variations increase, so that the calculation results are unstable.

Therefore, in the target height estimation method of the illustrative embodiment, target height estimation processing of accumulating, in a buffer 33a (refer to FIG. 2A), calculation values of the vertical azimuths, which are obtained in azimuth calculation processing that is periodically executed in correspondence to one scan of radio waves, including a calculation value of this time and calculation values of previous constant periods, and estimating a height of the target TG on the basis of the accumulated time-series data, not instantaneous values, is performed.

Specifically, as shown in FIG. 1C, in the target height estimation processing, the vertical azimuths of previous constant periods including the vertical azimuth of this time are acquired from the buffer 33a (step S1). Then, effective data is extracted from the acquired data (step S2).

Herein, the effective data indicates data except a calculation result, which is clearly ineffective, such as values deviating from a beam range of the radar device 1. As can be seen from FIG. 1B, calculation values that can be determined to clearly deviate from the beam range such as the height 10 m may be included in the calculation results. By the processing of step S2, it is possible to exclude such data.

Subsequently, as shown in FIG. 1C, in the target height estimation processing, for the effective data, moving average values of maximum values are calculated (step S3). Then, the calculated moving average values are set as estimated target height values (step S4). Therefore, in other words, in the target height estimation processing, the processing of normalizing the calculation results of the vertical azimuths and averaging the maximum values in the vertical direction and in the time axis direction is performed.

FIG. 1D depicts an example of the processing result of the target height estimation processing. As can be seen from FIG. 1D, the height of the target TG, which is the superjacent object, becomes the stable estimated target height values by obtaining the moving average values of the maximum values from the previous calculation results having variations.

Therefore, according to the target height estimation method of the illustrative embodiment, it is possible to estimate the height of the target with accuracy. In the meantime, the example of obtaining the moving average values of the maximum values has been described. However, moving average values of minimum values may be obtained. The moving average values of minimum values correspond to estimated virtual image height values, which are the vertical azimuth of the virtual image G. The estimated virtual image height values are obtained without variations, so that it is possible to accurately determine the virtual image G as an unnecessary target in unnecessary target determination processing, which will be described later.

Also, based on a difference between the estimated target height value and the estimated virtual image height value, a subjacent object fallen on the road surface 100 may be determined. This will be described later with reference to FIGS. 6A to 6C.

In the below, the radar device 1 to which the target height estimation method is applied is described in more detail.

Figure 2A:
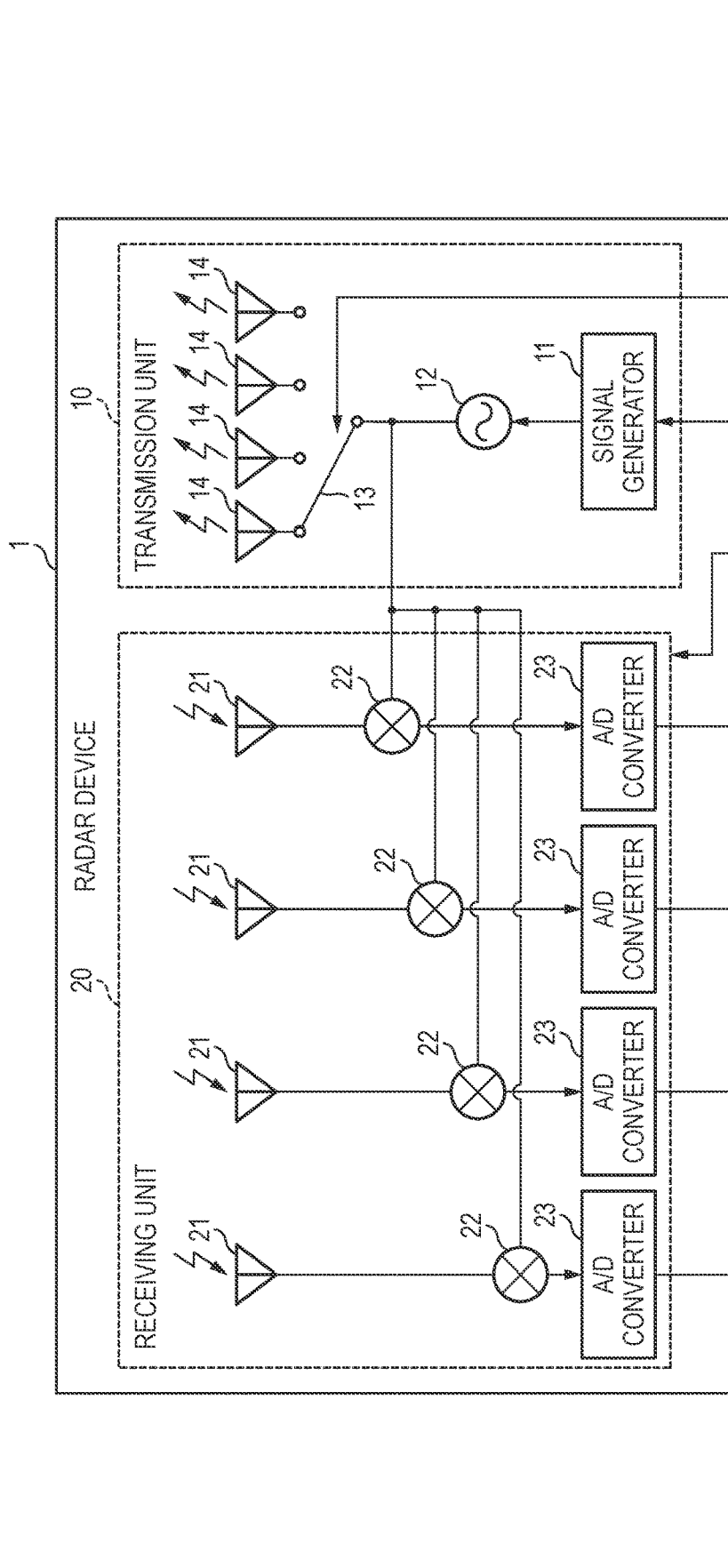
FIG. 2A is a block diagram of a radar device in accordance with the illustrative embodiment.
Figure 2B:
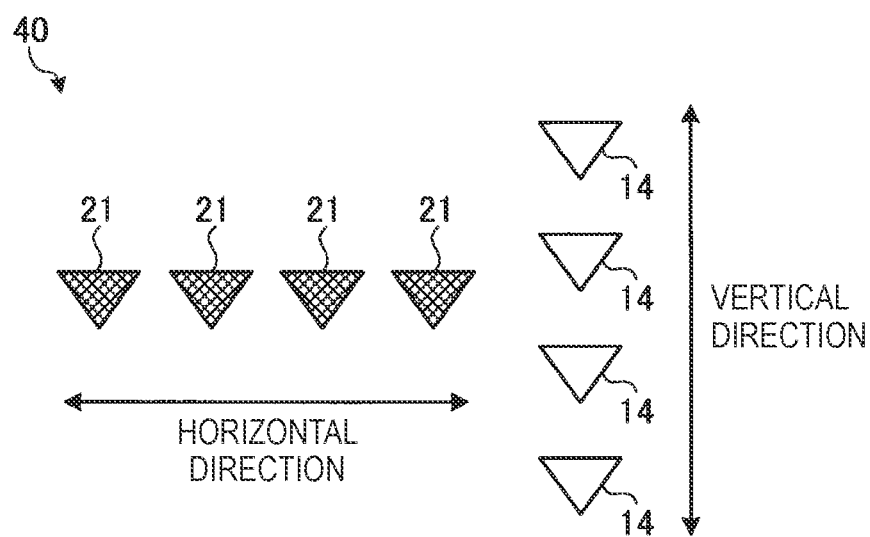
FIG. 2B depicts a configuration example of an antenna unit.
Figure 2C:
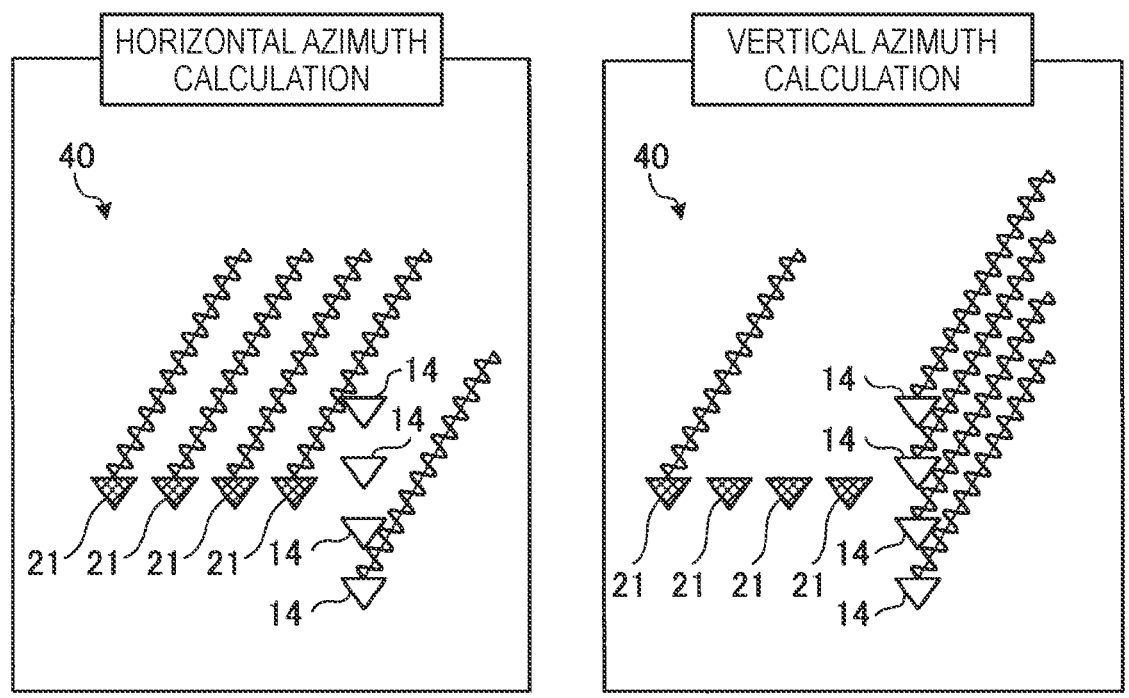
FIG. 2C illustrates operations of the antenna unit, which are to be performed when calculating a horizontal azimuth and a vertical azimuth.

FIG. 2A is a block diagram of the radar device 1 in accordance with the illustrative embodiment. FIG. 2B depicts a configuration example of the antenna unit. FIG. 2C illustrates operations of the antenna unit, which are to be performed when calculating the horizontal azimuth and the vertical azimuth. Meanwhile, in FIG. 2A, only constitutional elements necessary to describe features of the illustrative embodiment are shown as functional blocks, and the descriptions of the general constitutional elements are omitted.

In other words, the respective constitutional elements shown in FIG. 2A are functionally conceptual, and are not necessarily required to be physically configured, as shown. For example, the specific form of distribution/integration of the respective functional blocks is not limited to the shown example, and all or some of the functional blocks may be distributed/integrated functionally or physically in an arbitrary unit, depending on diverse loads, using situations and the like.

As shown in FIG. 2A, the radar device 1 includes a transmission unit 10, a receiving unit 20, and a processing unit 30, and is connected to a vehicle control device 2 configured to control behaviors of the own vehicle MC.

The vehicle control device 2 is configured to perform vehicle control such as PCS (Pre-crash Safety System), AEB (Advanced Emergency Braking System) and the like, based on a detection result of the target TG by the radar device 1. In the meantime, the radar device 1 may also be used for a variety of utilities (for example, monitoring of an airplane or a ship), in addition to the in-vehicle radar device.

The transmission unit 10 includes a signal generator 11, an oscillator 12, a switch 13, and transmission antennas 14. The signal generator 11 is configured to generate a modulation signal for transmitting millimeter waves frequency modulated by triangular waves under control of a transmission/receiving controller 31, which will be described later.

The oscillator 12 is configured to generate a transmission signal on the basis of the modulation signal generated by the signal generator 11, and to output the same to the switch 13. The switch 13 is configured to output the transmission signal input from the oscillator 12, to any one of the plurality of transmission antennas 14.

Specifically, the switch 13 can set the transmission antenna 14, to which the transmission signal is to be input, to any one transmission antenna or sequentially switch the transmission antennas in time division manner, based on the control of the transmission/receiving controller 31. In the meantime, as shown in FIG. 2A, the transmission signal generated by the oscillator 12 is also distributed to mixers 22, which will be described later.

The transmission antenna 14 is configured to convert the transmission signal from the switch 13 into a transmission wave, and to output the transmission wave to an outside of the own vehicle MC. The transmission wave output by the transmission antenna 14 is a continuous wave frequency modulated by a triangular wave. The transmission wave transmitted from the transmission antenna 14 to the outside of the own vehicle MC, for example, in front of the own vehicle MC is reflected on the target TG such as the other vehicle and becomes a reflection wave.

The receiving unit 20 includes a plurality of receiving antennas 21 to form an array of antennas, a plurality of mixers 22, and a plurality of A/D converters 23. The mixer 22 and the A/D converter 23 are provided for each of the receiving antennas 21.

Each receiving antenna 21 is configured to receive the reflection wave from the target TG, as a reception wave, to convert the reception wave into a received signal and to output the received signal to the mixer 22. In the meantime, the number of the receiving antennas 21 shown in FIG. 2A is four. However, three or less or five or more antennas may also be provided.

A configuration example of the antenna unit 40 where the respective transmission antennas 14 and the respective receiving antennas 21 are arranged is described. As shown in FIG. 2B, in the antenna unit 40 of the illustrative embodiment, the transmission antennas 14 are arranged in the vertical direction, for example. Also, the receiving antennas 21 are arranged in the horizontal direction.

As shown in FIG. 2C, upon the horizontal azimuth calculation, any one of the transmission antennas 14 transmits the transmission wave, for example, and each receiving antenna 21 receives the reception wave.

Upon the vertical azimuth calculation, the respective transmission antennas 14 are sequentially switched in the time division manner and transmit the transmission waves, and any one of the receiving antennas 21 receives the reception wave, for example.

Returning to FIG. 2A, the received signal output from the receiving antenna 21 is amplified by an amplifier (for example, a low noise amplifier) (not shown) and is then input to the mixer 22. The mixer 22 is configured to mix parts of the distributed transmission signal and the received signal input from the receiving antenna 21, to remove an unnecessary signal component to generate a beat signal, and to output the beat signal to the A/D converter 23.

The beat signal is a differential wave between the transmission wave and the reflection wave, and has a beat frequency, which is a difference between a frequency of the transmission signal (hereinafter, referred to as "transmission frequency") and a frequency of the received signal (hereinafter, referred to as "receiving frequency"). The beat signal generated in the mixer 22 is converted into a digital signal in the A/D converter 23, which is then output to the processing unit 30.

The processing unit 30 includes a transmission/receiving controller 31, a signal processor 32, and a storage 33. The signal processor 32 includes a frequency analysis unit 32a, a peak extraction unit 32b, an azimuth calculation unit 32c, a pairing unit 32d, a continuity determination unit 32e, a horizontal filter unit 32f, a target height estimation unit 32g, a target classification unit 32h, an unnecessary target determination unit 32i, a grouping unit 32j, and an output target selection unit 32k.

The storage 33 has a buffer 33a, an estimated target height value 33b, and an estimated virtual image height value 33c. In the buffer 33a, vertical azimuths of previous constant periods including a vertical azimuth of this time are accumulated. As the estimated target height value 33b and the estimated virtual image height value 33c, processing results of the target height estimation unit 32g are stored.

The processing unit 30 is a microcomputer including a CPU (Central Processing Unit), a ROM (Read Only Memory) and a RAM (Random Access Memory) corresponding to the storage 33, a register, input/output ports, and the like, and is configured to control the entire radar device 1.

The CPU (microcomputer) reads out and executes a program stored in the ROM, so that it functions as the transmission/receiving controller 31, the signal processor 32 and the like. In the meantime, both the transmission/receiving controller 31 and the signal processor 32 may be configured by hardware such as an ASIC (Application Specific Integrated Circuit), an FPGA (Field Programmable Gate Array) and the like.

The transmission/receiving controller 31 is configured to control the transmission unit 10 including the signal generator 11, and the receiving unit 20. The signal processor 32 is configured to periodically execute a series of signal processing. Subsequently, the respective constitutional elements of the signal processor 32 are described with reference to FIGS. 3 to 5G.

Figure 3:
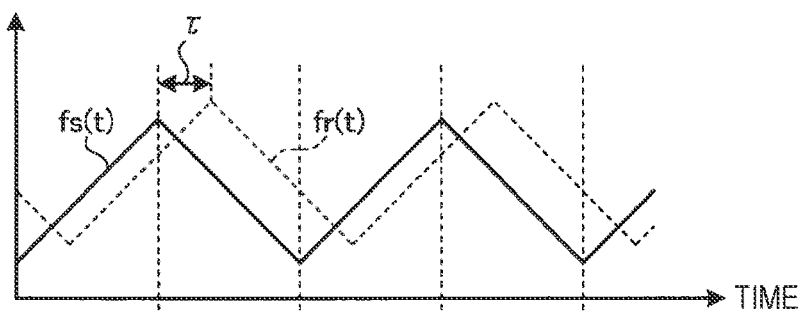
FIG. 3 illustrates processing from pre-processing of a signal processing unit to peak extraction processing in the signal processing unit.
Figure 3:
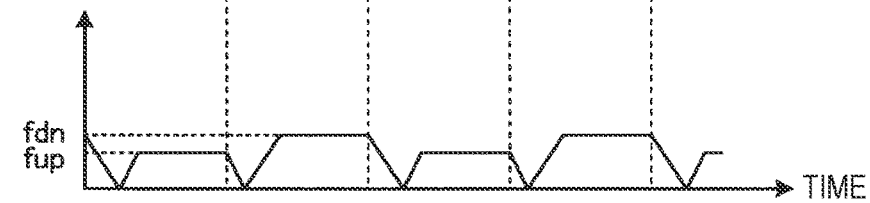
Figure 3:
Figure 3:
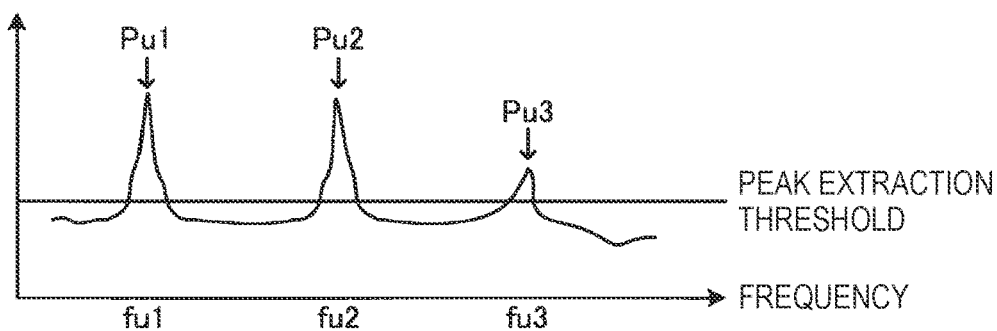
Figure 3:
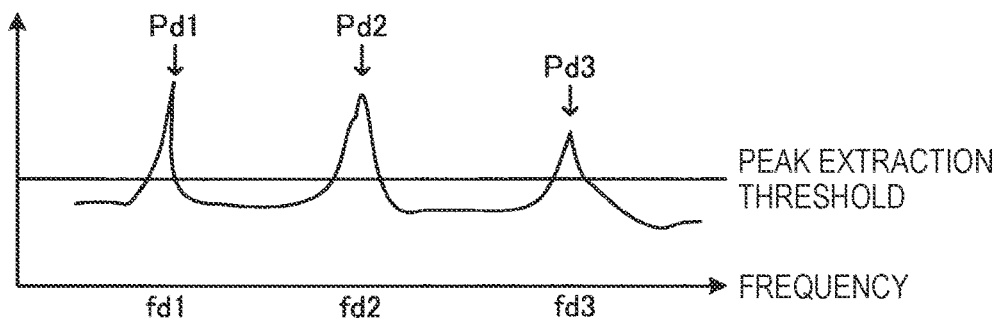
Figure 4A:
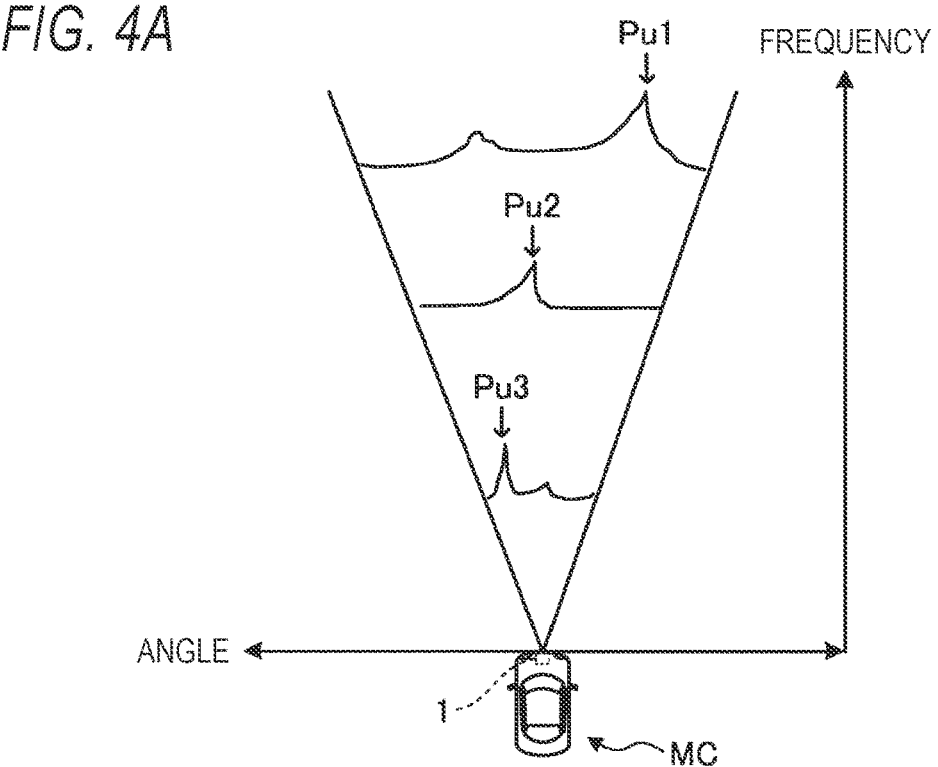
FIG. 4A illustrates azimuth calculation processing.
Figure 4B:
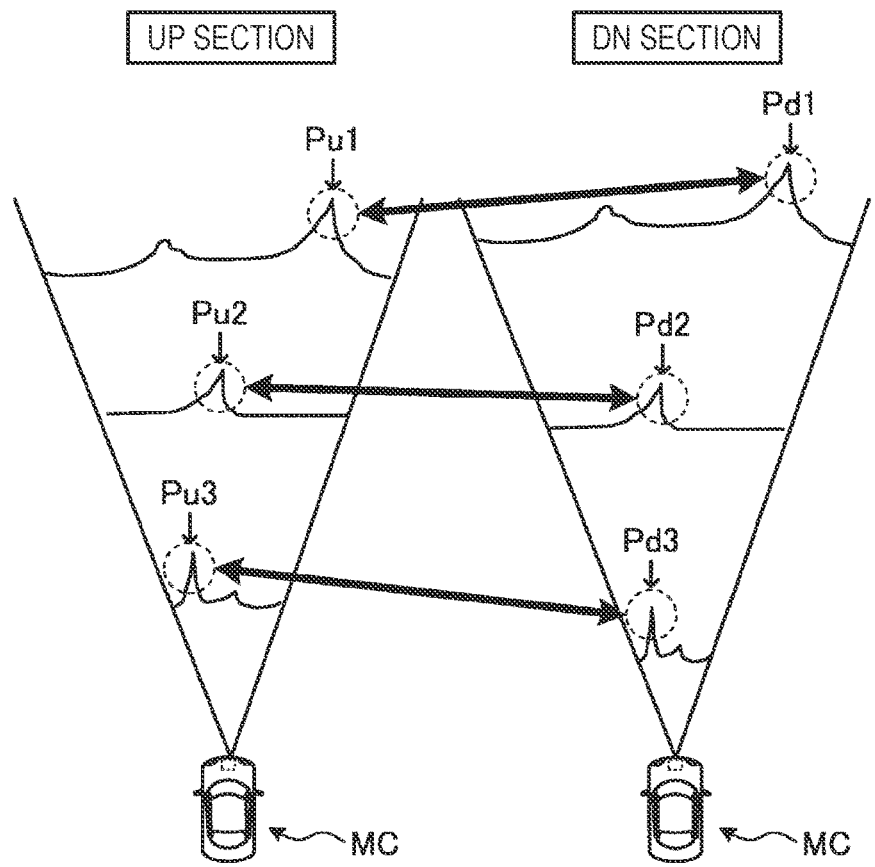
FIG. 4B illustrates pairing processing.
Figure 4C:
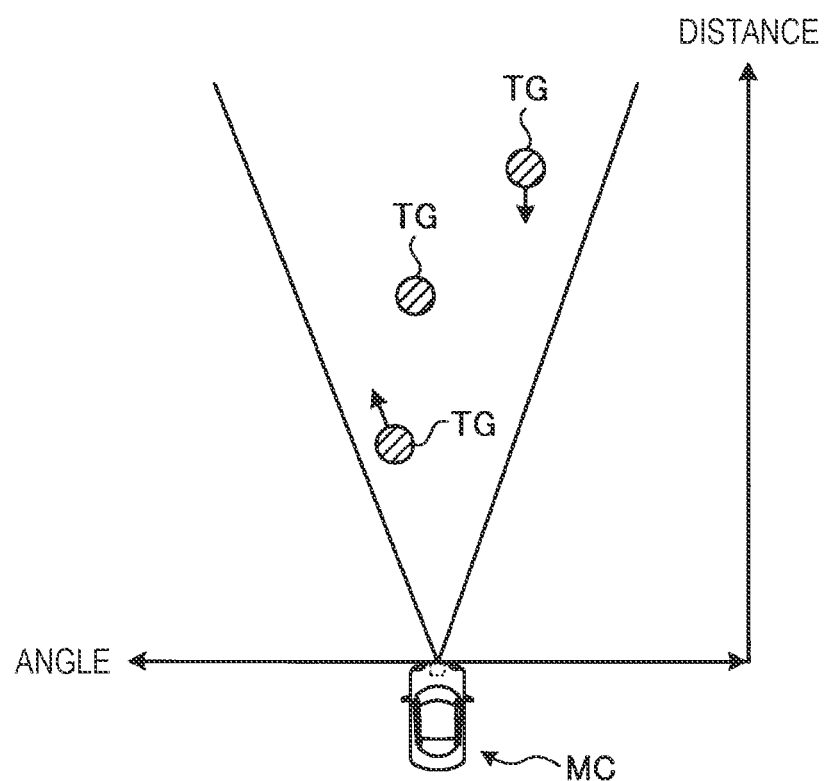
FIG. 4C illustrates the pairing processing.

FIG. 3 illustrates processing from pre-processing of the signal processor 32 to peak extraction processing in the signal processor 32. FIG. 4A illustrates azimuth calculation processing. FIGS. 4B and 4C illustrate pairing processing.

Figure 5A:
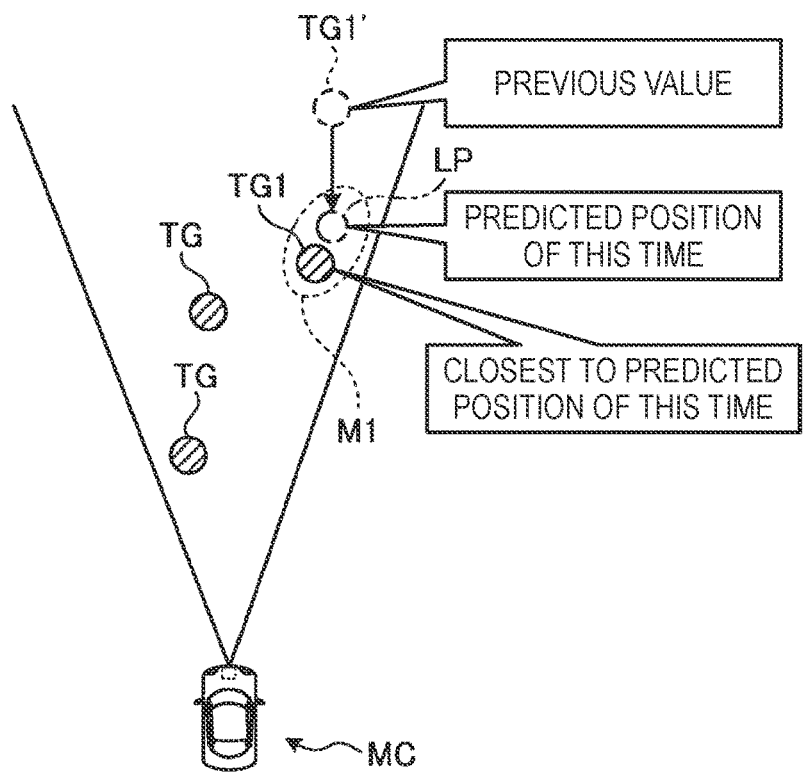
FIG. 5A illustrates continuity determination processing.
Figure 5B:
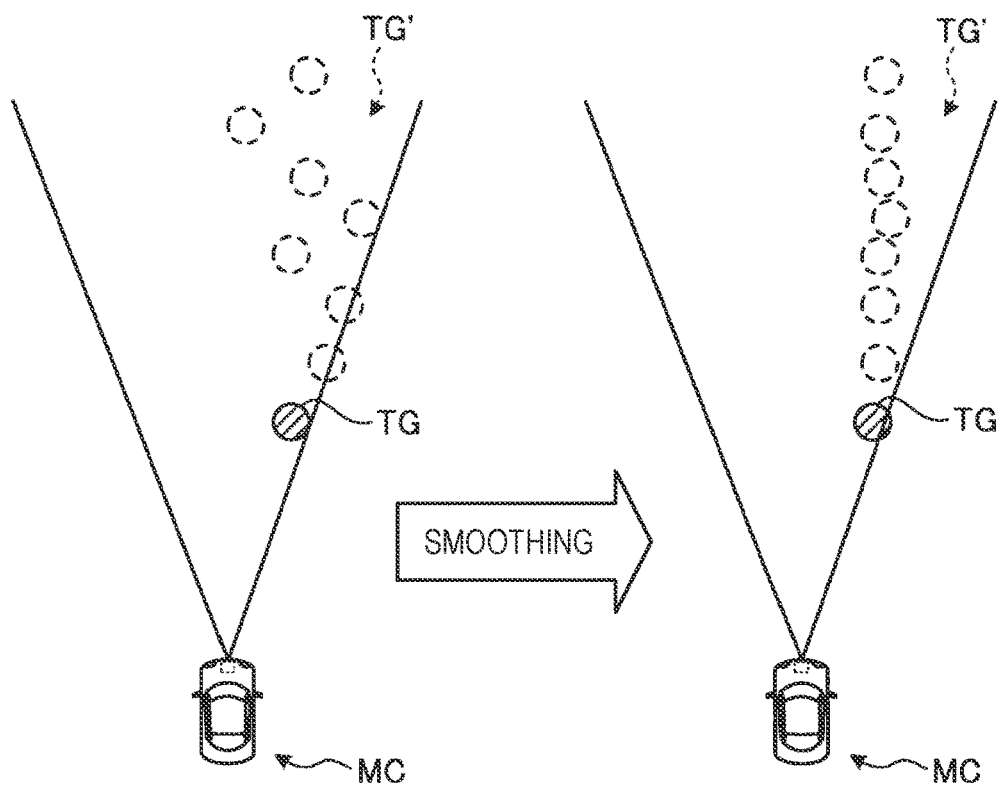
FIG. 5B illustrates horizontal filter processing.
Figure 5C:
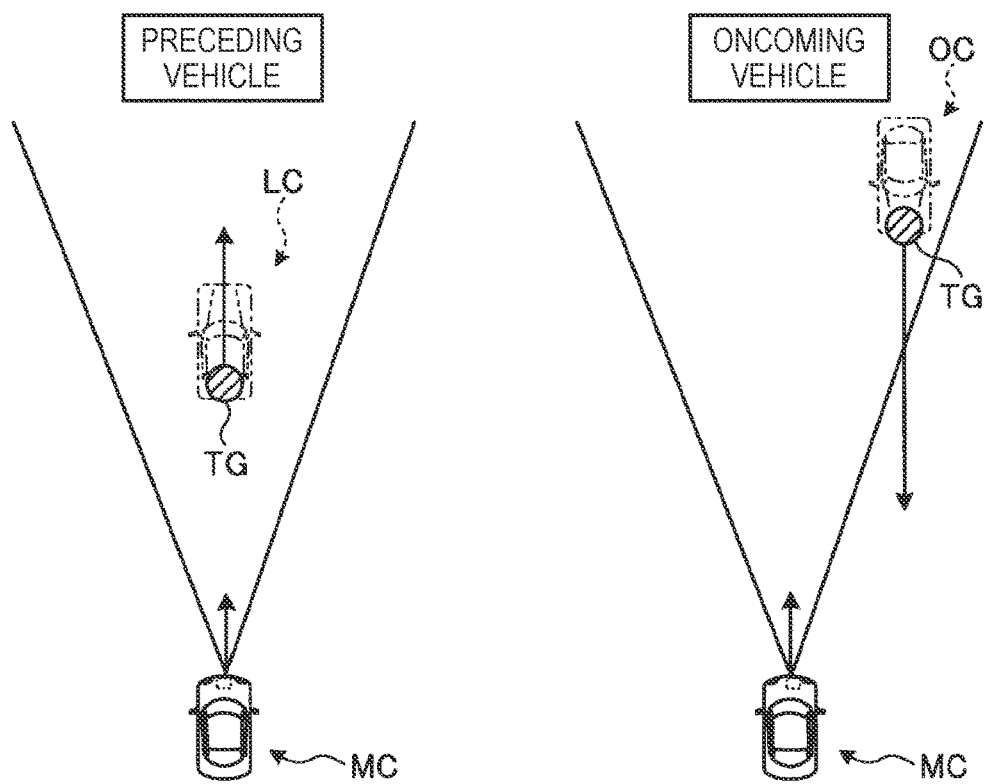
FIG. 5C illustrates target classification processing.
Figure 5D:
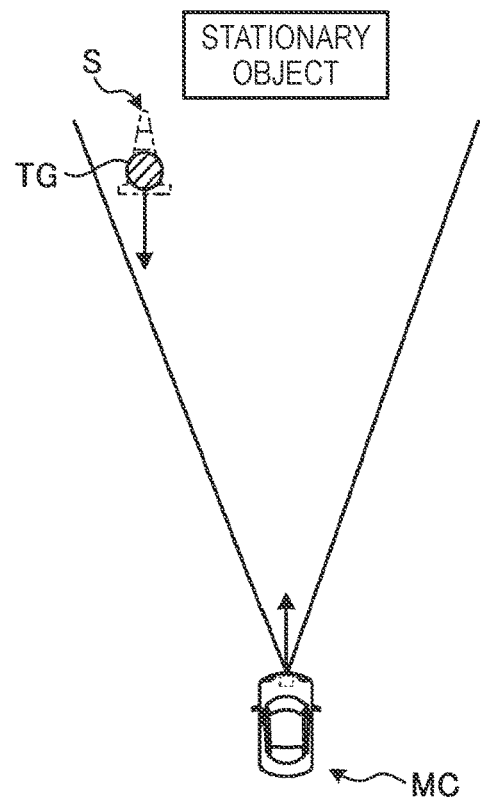
FIG. 5D illustrates the target classification processing.
Figure 5E:
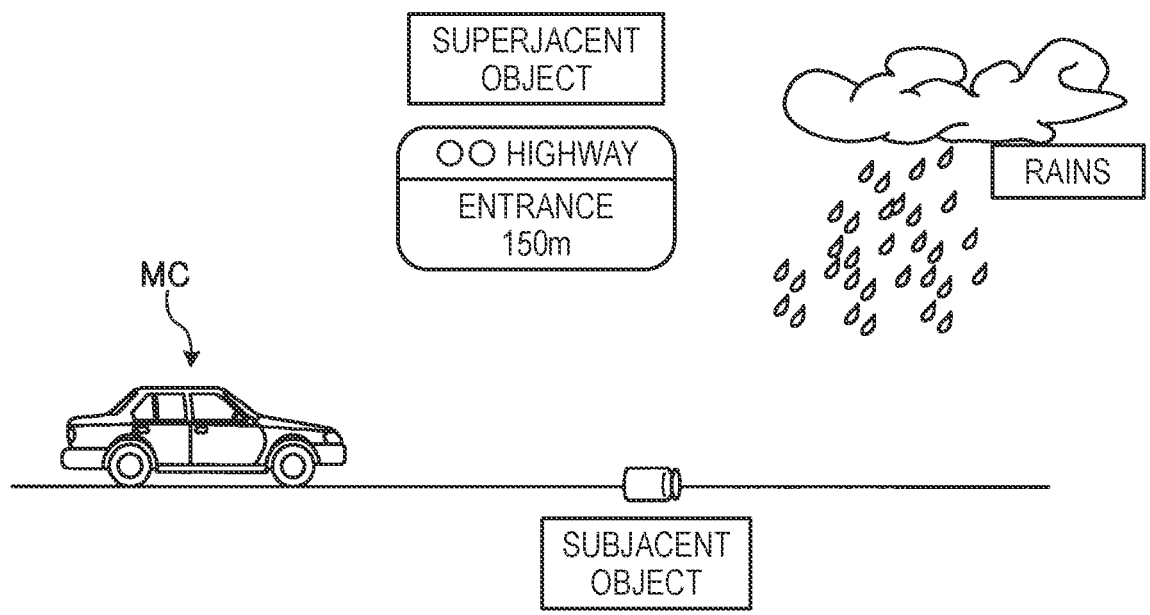
FIG. 5E illustrates unnecessary target determination processing.
Figure 5F:
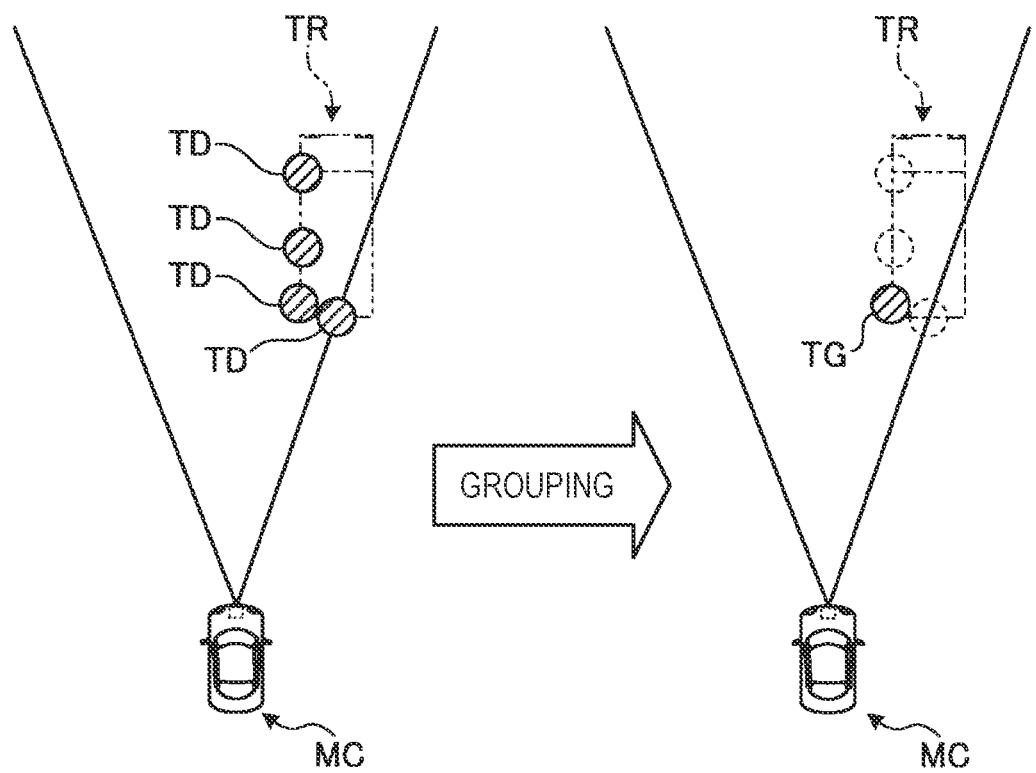
FIG. 5F illustrates grouping processing.
Figure 5G:
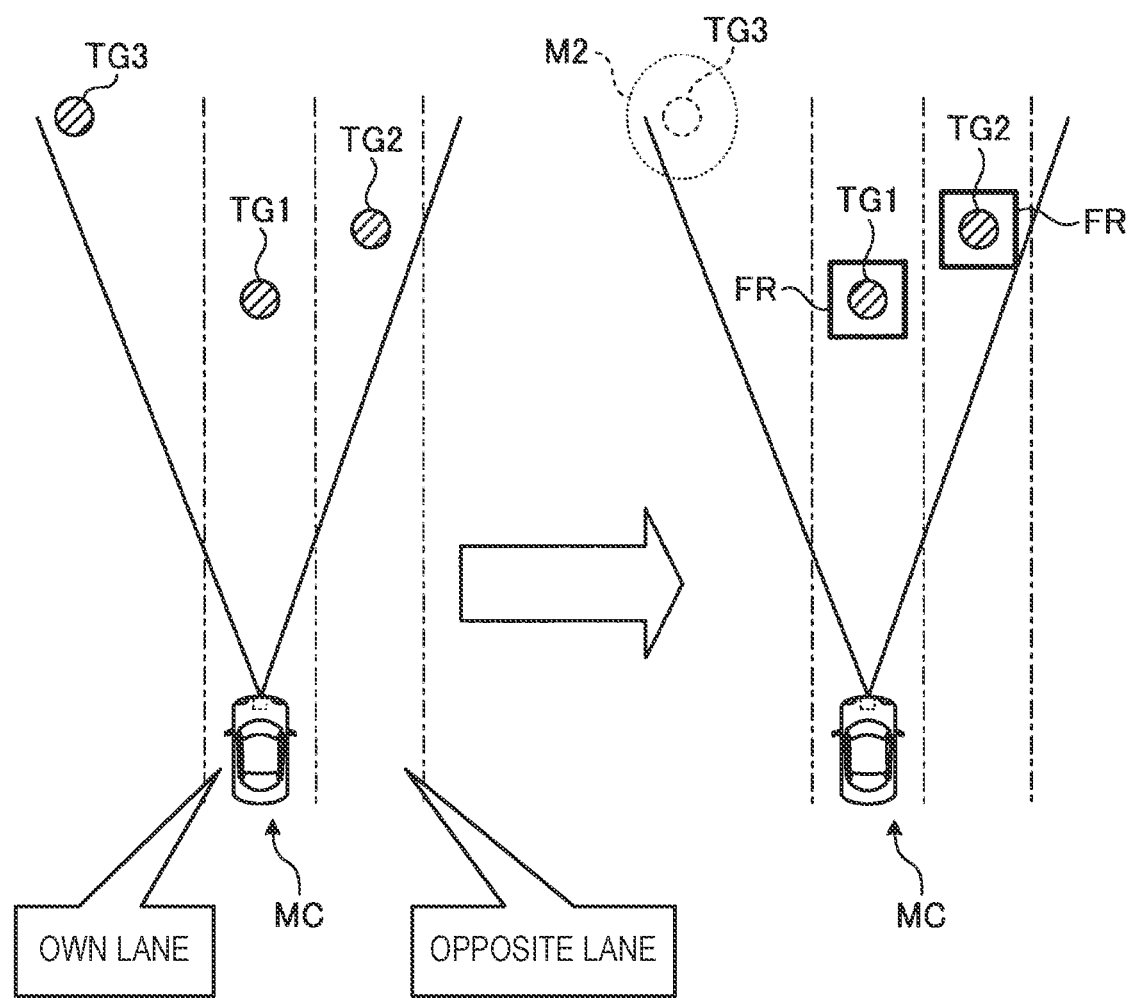
FIG. 5G illustrates output target selection processing.

FIG. 5A illustrates continuity determination processing. FIG. 5B illustrates horizontal filter processing. FIGS. 5C and 5D illustrate target classification processing. FIG. 5E illustrates unnecessary target determination processing. FIG. 5F illustrates grouping processing. FIG. 5G illustrates output target selection processing.

The frequency analysis unit 32a is configured to perform Fast Fourier Transform (FFT) processing (hereinafter, referred to as "FFT processing") for the beat signal input from each A/D converter 23, and to output a result thereof to the peak extraction unit 32b. The result of the FFT processing is a frequency spectrum of the beat signal, and is a power value (signal level) for each frequency of the beat signal (for each of frequency bins set at frequency intervals corresponding to a frequency resolution).

The peak extraction unit 32b is configured to extract peak frequencies, which become peaks of the result of the FFT processing executed by the frequency analysis unit 32a, to reflect the peak frequencies in target data, and to output the same to the azimuth calculation unit 32c. In the meantime, the peak extraction unit 32b is configured to extract the peak frequencies for each of an "UP section" and a "DN section" of the beat signal, which will be described later.

The azimuth calculation unit 32c is configured to calculate an arrival azimuth and a power value of the reflection wave corresponding to each of the peak frequencies extracted in the peak extraction unit 32b. At this time, since the arrival azimuth is an azimuth at which the target TG is estimated to exist, the arrival azimuth may be hereinafter referred to as "estimated azimuth". The estimated azimuth includes a horizontal azimuth and a vertical azimuth.

Also, the azimuth calculation unit 32c is configured to accumulate the calculated vertical azimuths of previous constant periods including a vertical azimuth of this time in the buffer 33a. Also, the azimuth calculation unit 32c is configured to output the calculated estimated azimuth and the power value to the pairing unit 32d.

The pairing unit 32d is configured to determine the correct association of the peak frequencies of each of the "UP section" and the "DN section", based on the calculation result of the azimuth calculation unit 32c, and to calculate a distance and a relative speed of each target TG from the determination result. Also, the pairing unit 32d is configured to reflect the estimated azimuth, distance and relative speed of each target TG in the target data, and to output the same to the continuity determination unit 32e.

The flow from the pre-processing of the signal processor 32 to this processing in the signal processor 32 is shown in FIGS. 3 to 4C. In the meantime, FIG. 3 is divided into three parts by two thick downward white arrows. In the below, the respective parts are referred to as an upper part, a middle part and a lower part in order.

As shown in the upper part of FIG. 3, after the transmission signal fs(t) is transmitted from the transmission antenna 14, as the transmission wave, it is reflected on the target TG, arrives as the reflection wave, and is received at the receiving antenna 21, as the received signal fr(t).

At this time, as shown in the upper part of FIG. 3, the received signal fr(t) is delayed with respect to the transmission signal fs(t) by a time difference τ, in correspondence to a distance between the own vehicle MC and the target TG. By the time difference τ and a Doppler effect based on the relative speeds of the own vehicle MC and the target TG, the beat signal is obtained as a signal in which a frequency fup of "UP section" where the frequency increases and a frequency fdn of "DN section" where the frequency decreases are repeated (refer to the middle part of FIG. 3)

The lower part of FIG. 3 pictorially depicts a result of the FFT processing that was performed for the beat signal by the frequency analysis unit 32a, for "UP section" and "DN section".

As shown in the lower part of FIG. 3, after the FFT processing, waveforms are obtained in the respective frequency regions of "UP section" and "DN section". The peak extraction unit 32b extracts the peak frequencies that become peaks in the waveforms.

For example, in the example shown in the lower part of FIG. 3, a peak extraction threshold is used, so that peaks Pu 1 to Pu3 are respectively determined as peaks and peak frequencies fu 1 to fu3 are respectively extracted, in "UP section".

Also, in "DN section", the peak extraction threshold is also used, so that peaks Pd 1 to Pd3 are respectively determined as peaks and peak frequencies fd 1 to fd3 are respectively extracted.

In the frequency component of each peak frequency extracted by the peak extraction unit 32b, the reflection waves from a plurality of targets TG may be mixed. Therefore, the azimuth calculation unit 32c is configured to perform the azimuth calculation for each of the peak frequencies, and to interpret the existence of the target TG corresponding each peak frequency.

In the meantime, the azimuth calculation of the azimuth calculation unit 32c may be performed using the well-known arrival direction estimation method such as ESPRIT (Estimation of Signal Parameters via Rotational Invariance Techniques), for example.

FIG. 4A pictorially depicts the azimuth calculation result performed by the azimuth calculation unit 32c. The azimuth calculation unit 32c calculates the estimated azimuths of the respective targets TG corresponding to the peaks Pu 1 to Pu3, from the peaks Pu 1 to Pu3 of the azimuth calculation result. Also, magnitudes of the respective peaks Pu 1 to Pu3 are the power values. The azimuth calculation unit 32c performs the azimuth calculation processing for each of "UP section" and "DN section", as shown in FIG. 4B.

Also, although not shown in FIG. 4A, which is a pictorial plan view, a horizontal azimuth and a vertical azimuth, which are required to be combined so as to correspond to the same target, of the horizontal azimuths and the vertical azimuths included in the estimated azimuths of the respective targets TG calculated by the azimuth calculation unit 32c are combined on the basis of a difference of the power values, and the like.

The pairing unit 32d is configured to perform a pairing of associating the respective peaks of which the estimated azimuths and the power values are close to each other in the azimuth calculation result performed by the azimuth calculation unit 32c, as shown in FIG. 4B. Also, the pairing unit 32d is configured to calculate a distance and a relative speed of each target G corresponding to each of the associated peaks.

The distance can be calculated on the basis of a relation of "distance∝(fup+fdn)". The relative speed can be calculated on the basis of a relation of "speed∝(fup−fdn)". As a result, as shown in FIG. 4C, the pairing processing result indicative of the estimated azimuth, distance and relative speed of each target TG relative to the own vehicle MC is obtained.

Subsequently, the continuity determination unit 32e is described. The continuity determination unit 32e is configured to determine temporal continuity between the target data detected up to the previous scans and the target data of the latest period (this scan), to reflect a result of the determination in the target data, and to output the same to the horizontal filter unit 32f.

Specifically, as shown in FIG. 5A, the continuity determination unit 32e calculates a predicted position LP of this time on the basis of the previous values, for example, the previous position and the previous speed corresponding to the target TG1' detected up to the previous scans. Then, the continuity determination unit 32e determines the target TG, which is closest to the predicted position LP of this time, of the targets TG under determination in this scan, as a target TG1 that is temporally continuous to the target TG1' up to the previous time (refer to M1 in FIG. 5A).

Subsequently, the horizontal filter unit 32f is described. The horizontal filter unit 32f is configured to perform horizontal filter processing of smoothing the target data in the horizontal direction and in the time axis direction, to reflect a result thereof in the target data, and to output the same to the target classification unit 32h.

FIG. 5B pictorially depicts the horizontal filter processing that is to be executed by the horizontal filter unit 32f. That is, as shown in FIG. 5B, in the filter processing, the targets of this prediction and the target TG of this time based on the continuous targets TG' up to the previous time are smoothed, i.e., the plurality of times of instantaneous value data is averaged to suppress the variations of the instantaneous value data and to increase the detection accuracy of the target TG.

Subsequently, the target height estimation unit 32g is described. The target height estimation unit 32g is configured to execute target height estimation processing including steps S1 to S4 (refer to FIG. 1C). That is, the target height estimation unit 32g is configured to acquire the vertical azimuths of previous constant periods including the vertical azimuth of this time from the buffer 33a. Also, the target height estimation unit 32g is configured to extract effective data by excluding ineffective data from the data acquired from the buffer 33a.

Figure 6A:
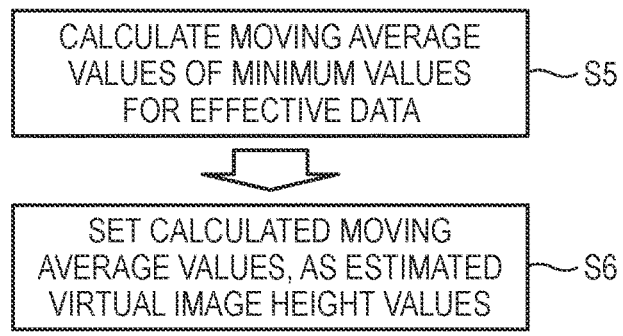
FIG. 6A illustrates the other processing of target height estimation processing.
Figure 6B:
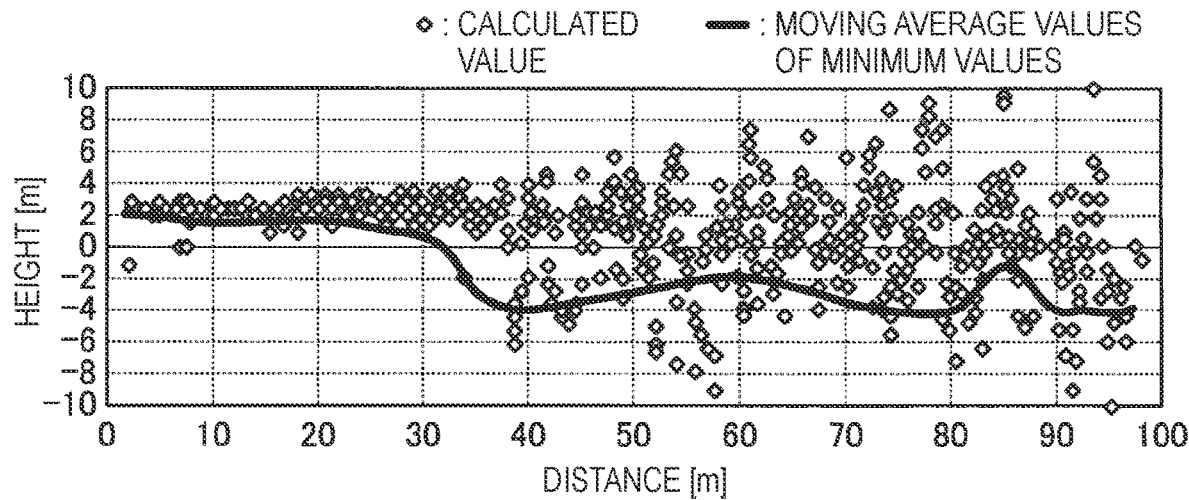
FIG. 6B illustrates the other processing of the target height estimation processing.
Figure 6C:
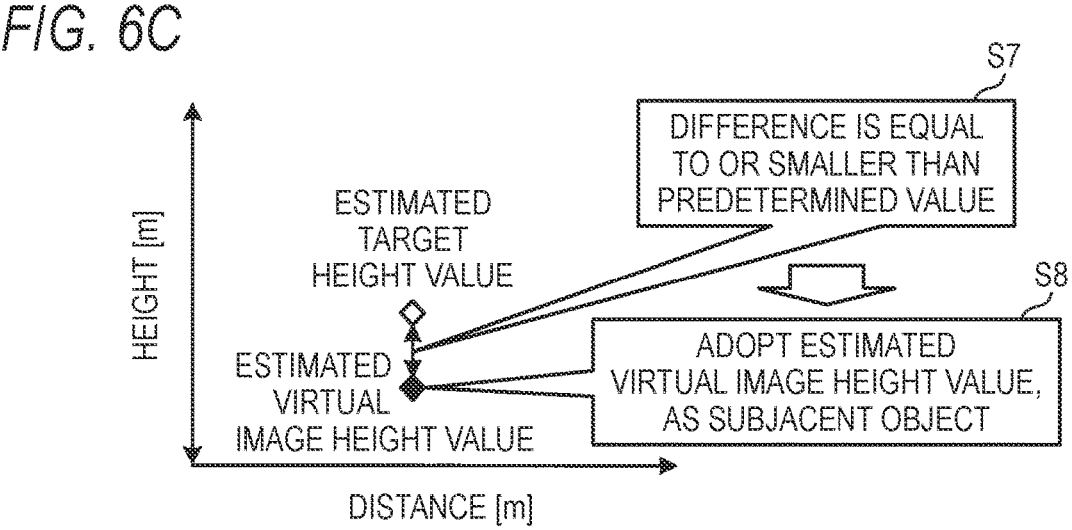
FIG. 6C illustrates the other processing of the target height estimation processing)

Also, the target height estimation unit 32g is configured to calculate moving average values of maximum values for the extracted effective data, and to store the calculated moving average values in the storage 33, as the estimated target height value 33b. Here, the other processing to be included in the target height estimation processing is described with reference to FIGS. 6A to 6C. FIGS. 6A to 6C illustrate the other processing of the target height estimation processing.

As shown in FIG. 6A, the target height estimation unit 32g calculates moving average values of minimum values for the extracted effective data (step S5). Also, the target height estimation unit 32g stores the calculated moving average values of minimum values in the storage 33, as the estimated virtual image height value 33c (step S6).

FIG. 6B depicts an example of the calculation processing result of the moving average values of the minimum values. As can be seen from FIG. 6B, the estimated virtual image height values 33c, which are the vertical azimuths of the virtual image G, are smoothed in the vertical direction and in the time axis direction, and the variations thereof are suppressed.

The estimated virtual image height values 33c are obtained without variations, so that it is possible to accurately determine the virtual image G, as an unnecessary target, in unnecessary target determination processing, which will be described later.

Also, as shown in FIG. 6C, the target height estimation unit 32g compares the estimated target height value 33b and the estimated virtual image height value 33c, determines the target TG, as a subjacent object, when a difference of the estimated values is equal to or smaller than a predetermined value (step S7), and adopts the estimated virtual image height value 33c, as a height of the target TG (step S8).

When the target TG is a subjacent object fallen on the road surface 100, the multipath does not occur. Therefore, the decrease in difference between the estimated target height values 33b and the estimated virtual image height values 33c is used as the determination material. The reason to adopt the estimated virtual image height value 33c is described. Since the estimated target height value 33b is the moving average value of the maximum value and the estimated virtual image height value 33c is the moving average value of the minimum value, it is thought that the estimated virtual image height value 33c has the higher degree of certainty, as the height of the subjacent object fallen on the road surface 100.

In this way, the subjacent object and the height thereof are investigated, so that it is possible to accurately determine the target TG, as the subjacent object, in the unnecessary target determination processing, which will be described later.

Returning to FIG. 2A, the target classification unit 32h is described. The target classification unit 32h is configured to perform target classification processing of classifying types of the target data, to reflect a result thereof in the target data, and to output the same to the unnecessary target determination unit 32i.

FIGS. 5C and 5D pictorially depict a classification example performed by the target classification unit 32h. As shown in FIG. 5C, the target classification unit 32h can classify the target TG, as a moving object such as a preceding vehicle LC and an oncoming vehicle OC, for example.

Specifically, the target classification unit 32h classifies the target TG of which relative speed is greater than a reverse direction of the own vehicle speed of the own vehicle MC, as the preceding vehicle LC. Also, the target classification unit 32h classifies the target TG of which relative speed is smaller than the reverse direction of the own vehicle speed of the own vehicle MC, as the oncoming vehicle OC.

Also, as shown in FIG. 5D, the target classification unit 32h can classify the target TG, as a stationary object S, for example. Specifically, the target classification unit 32h classifies the target TG of which relative speed is substantially reverse to the own vehicle speed of the own vehicle MC, as the stationary object S.

Subsequently, the unnecessary target determination unit 32i is described. The unnecessary target determination unit 32i is configured to perform unnecessary target determination processing of determining whether a target is an unnecessary target TG with respect to the system control, to reflect a result thereof in the target data, and to output the same to the grouping unit 32j.

FIG. 5E pictorially depicts an example of a target that is determined as an unnecessary target by the unnecessary target determination unit 32i. As shown in FIG. 5E, the unnecessary target determination unit 32i determines a "superjacent object" such as a road sign, "rains", and a "subjacent object", which does not cause any problem to the traveling of the own vehicle MC, for example, as the unnecessary target.

Upon the determination, the estimated target height value 33b or the estimated virtual image height value 33c output from the target height estimation unit 32g and stored in the storage 33 can be used. The unnecessary target includes a structure, road surface reflection, wall reflection, a reflection ghost, the virtual image G and the like, in addition to the above examples. The target TG determined as an unnecessary target is not basically an output target of the radar device 1.

Subsequently, the grouping unit 32j is described. The grouping unit 32j is configured to perform grouping processing of aggregating a plurality of target data based on the same object to one data, to reflect a result thereof in the target data, and to output the same to the output target selection unit 32k.

FIG. 5F pictorially depicts the grouping processing that is performed by the grouping unit 32j. That is, as shown in FIG. 5F, the grouping unit 32j regards targets, which are estimated as reflected points from the same object (for example, a truck TR), of a plurality of detected targets, as divided targets TD, and aggregates the same to one target TG. This grouping is performed on the basis of conditions that detected positions are close to each other, the speeds are similar to each other, and the like, for example.

Subsequently, the output target selection unit 32k is described. The output target selection unit 32k is configured to perform output target selection processing of selecting a target TG that is required to be output to the vehicle control device 2 with respect to the system control, and to output the target data of the selected target TG to the vehicle control device 2.

FIG. 5G pictorially depicts the output target selection processing that is performed by the output target selection unit 32k. Basically, the output target selection unit 32k preferentially selects the target TG detected at a position close to an own lane.

Therefore, as shown in FIG. 5G, for example, when the target TG1 on the own lane, the target TG2 on an opposite lane (or an adjacent lane) and the target TG3 at a position deviating from the own lane are respectively detected, the output target selection unit 32k does not select the target TG3, for example (refer to M2 in FIG. 5G).

In this case, the output target selection unit 32k selects the target TG1 and the target TG2, which are thought to be necessary for PCS or AEB (refer to frames FR in FIG. 5G).

Figure 7A:
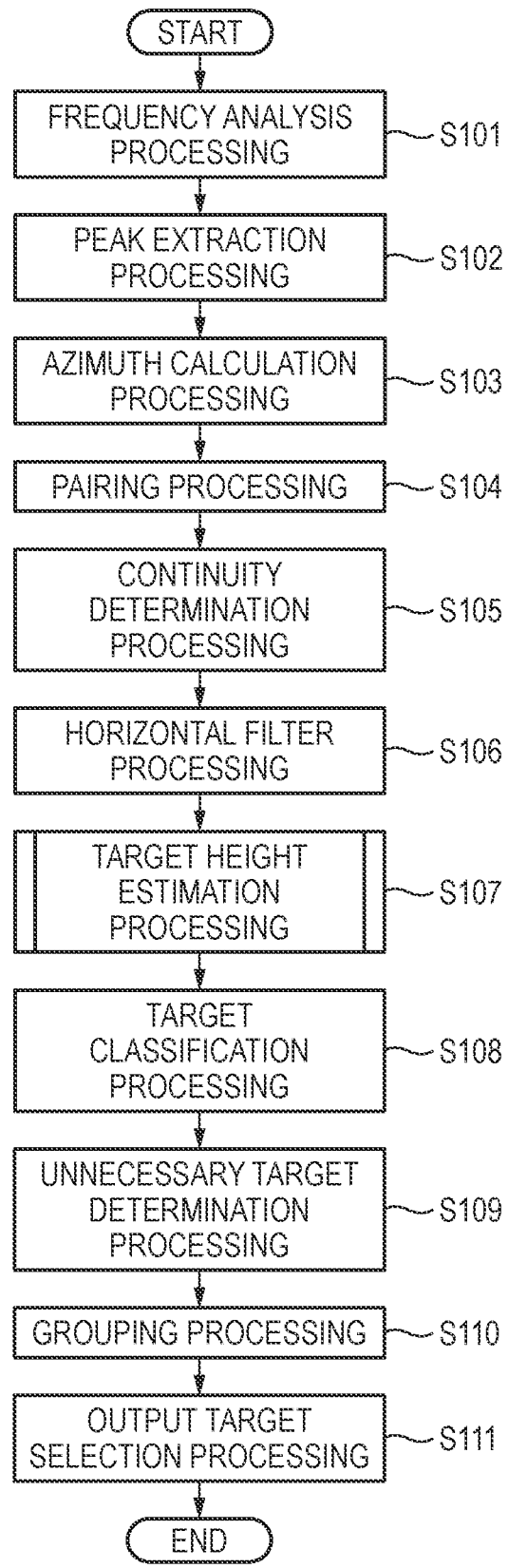
FIG. 7A is a flowchart depicting a processing sequence that is to be executed by a processing unit of the radar device in accordance with the illustrative embodiment.
Figure 7B:
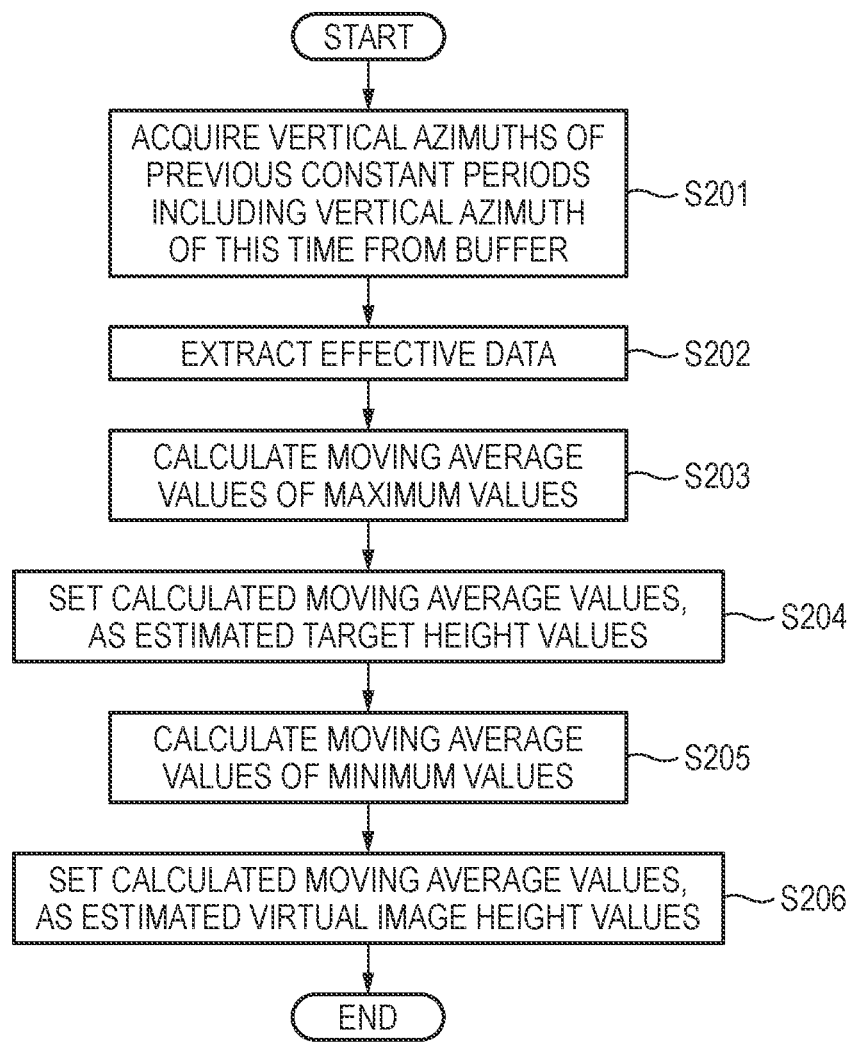
FIG. 7B is a flowchart depicting a processing sequence of the target height estimation processing.

Subsequently, a processing sequence that is to be executed by the processing unit 30 of the radar device 1 of the illustrative embodiment is described with reference to FIGS. 7A and 7B. FIG. 7A is a flowchart depicting a processing sequence that is to be executed by the processing unit 30 of the radar device 1 in accordance with the illustrative embodiment. FIG. 7B is a flowchart depicting a processing sequence of the target height estimation processing. In the meantime, here, a processing sequence of a series of signal processing corresponding to one scan is shown.

As shown in FIG. 7A, the frequency analysis unit 32a first executes the frequency analysis processing (step S101). Then, the peak extraction unit 32b executes the peak extraction processing (step S102).

Then, the azimuth calculation unit 32c executes the azimuth calculation processing (step S103), and the pairing unit 32d executes the pairing processing on the basis of the result thereof (step S104).

Then, the continuity determination unit 32e executes the continuity determination processing (step S105), and the horizontal filter unit 32f executes the horizontal filter processing (step S106).

Then, the target height estimation unit 32g executes the target height estimation processing (step S107). In the target height estimation processing, as shown in FIG. 7B, the target height estimation unit 32g acquires the vertical azimuths of previous constant periods including the vertical azimuth of this time from the buffer 33a (step S201).

Then, the target height estimation unit 32g extracts the effective data by excluding the ineffective data from the acquired data (step S202). Then, the target height estimation unit 32g calculates the moving average values of the maximum values for the extracted effective data (step S203).

Then, the target height estimation unit 32g sets the calculated moving average values, as the estimated target height value 33b (step S204). Then, the target height estimation unit 32g calculates the moving average values of the minimum values for the extracted effective data (step S205).

Then, the target height estimation unit 32g sets the calculated moving average values, as the estimated virtual image height value 33c (step S206). In the meantime, although not shown, the target height estimation unit 32g may subsequently execute processing of determining whether the target is a subjacent object on the basis of the difference between the estimated target height value 33b and the estimated virtual image height value 33c and processing of determining the height of the subjacent object when the target is the subjacent object (refer to step S7 and step S8 of FIG. 6C).

Then, the target height estimation unit 32g ends the target height estimation processing. Returning to FIG. 7A, the target classification unit 32h subsequently executes the target classification processing (step S108).

Then, the unnecessary target determination unit 32i executes the unnecessary target determination processing (step S109), and the grouping unit 32j executes the grouping processing (step S110). Then, the output target selection unit 32k executes the output target selection processing (step S111), so that the series of signal processing corresponding to one scan is over.

As described above, the radar device 1 of the illustrative embodiment is the radar device 1 configured to detect the target TG by executing the signal processing on the basis of the transmission wave and the reflection wave of the transmission wave reflected on the target TG, and includes the antenna unit 40, the azimuth calculation unit 32c (corresponding to an example of "calculation unit"), and the target height estimation unit 32g (corresponding to an example of "estimation unit").

The antenna unit 40 includes the plurality of transmission antennas 14 (corresponding to an example of "antennas") arranged in the vertical direction. The azimuth calculation unit 32c is configured to calculate the vertical azimuths of the target TG on the basis of the reflection waves with respect to the transmission waves transmitted from the transmission antennas 14, and to accumulate the calculation results.

The target height estimation unit 32g is configured to calculate the moving average values of the maximum values of the vertical azimuths on the basis of the calculation results accumulated by the azimuth calculation unit 32c, and to estimate the moving average values of the maximum value, as the height of the target TG.

Therefore, according to the radar device 1 of the illustrative embodiment, it is possible to estimate the height of the target TG with accuracy.

Also, the target height estimation unit 32g is configured to calculate the moving average values of the maximum values for the effective data obtained by excluding the ineffective data from the calculation results accumulated by the azimuth calculation unit 32c.

Therefore, according to the radar device 1 of the illustrative embodiment, since the height of the target TG is estimated on the basis of the normalized data, it is possible to further increase the accuracy of the height of the target TG to be estimated.

Also, the target height estimation unit 32g is configured to calculate the moving average values of the minimum values of the vertical azimuths on the basis of the calculation result, and to estimate the moving average values of the minimum values, as the height of the virtual image G corresponding to the target TG.

Therefore, according to the radar device 1 of the illustrative embodiment, it is possible to estimate the height of the virtual image G corresponding to the target TG with accuracy.

Also, when the difference between the height of the target TG and the height of the virtual image G estimated is equal to or smaller than the predetermined value, the target height estimation unit 32g determines that the target TG is a subjacent object, and adopts the height of the virtual image G, as the height of the subjacent object.

Therefore, according to the radar device 1 of the illustrative embodiment, it is possible to estimate the subjacent object, which is fallen on the road surface 100 and should be determined as an unnecessary target, and the height thereof with accuracy.

Meanwhile, in the above illustrative embodiment, the radar device 1 adopts the FM-CW method. However, the present disclosure is not limited thereto. For example, an FCM (Fast Chirp Modulation) method can also be adopted. In the meantime, when the FCM method is adopted, since the pairing processing is not required, it is possible to exclude the pairing unit 32*d* from the constitutional elements.

Also, in the above illustrative embodiment, the ESPRIT has been exemplified as the arrival direction estimation method that is used by the radar device 1. However, the present disclosure is not limited thereto. For example, a DBF (Digital Beam Forming), a PRISM (Propagator method based on an Improved Spatial-smoothing Matrix), a MUSIC (Multiple Signal Classification) and the like can also be used.

Also, in the above illustrative embodiment, the radar device 1 is provided to the own vehicle MC. However, the radar device 1 may be provided to a moving object except for a vehicle, such as a ship, an airplane and the like.

The additional effects and modified embodiments can be easily conceived by one skilled in the art. For this reason, the wider aspects of the present disclosure are not limited to the specific and representative illustrative embodiment as described above. Therefore, a variety of changes can be made without departing from the concepts or scope of the general inventions defined by the appended claims and equivalents thereof.

What is claimed is:

1. A radar device configured to detect a target by executing signal processing on the basis of a transmission wave and a reflection wave of the transmission wave reflected on the target, the radar device comprising:
    a plurality of antennas arranged in a vertical direction; and
    at least one hardware processor configured to
        calculate vertical angles of the target on the basis of the reflection waves with respect to the transmission waves transmitted from each of the antennas, and to accumulate calculation results, and
        calculate moving average values of maximum values of the vertical angles on the basis of the calculation results accumulated, and to estimate the moving average values of the maximum values, as a height of the target.

2. The radar device according to claim 1, wherein the hardware processor is configured to calculate the moving average values of the maximum values for effective data obtained by excluding ineffective data from the calculation result accumulated by the calculation unit.

3. The radar device according to claim 1, wherein the hardware processor is configured to calculate moving average values of minimum values of the vertical angles on the basis of the calculation results, and to estimate the moving average values of the minimum values, as a height of a virtual image corresponding to the target.

4. The radar device according to claim 3, wherein when a difference between the height of the target and the height of the virtual image estimated is equal to or smaller than a predetermined value, the hardware processor determines that the target is a subjacent object, and adopts the height of the virtual image, as a height of the subjacent object.

5. A target height estimation method of using a radar device comprising a plurality of antennas arranged in a vertical direction, the radar device being configured to detect a target by executing signal processing on the basis of a transmission wave and a reflection wave of the transmission wave reflected on the target, the target height estimation method comprising:
    calculating vertical angles of the target on the basis of the reflection waves with respect to the transmission waves transmitted from each of the antennas, and accumulating calculation results, and
    calculating moving average values of maximum values of the vertical angles on the basis of the calculation results accumulated, and estimating the moving average values of the maximum values, as a height of the target.

* * * * *